(12) United States Patent
Huang et al.

(10) Patent No.: US 10,792,840 B2
(45) Date of Patent: Oct. 6, 2020

(54) MELT IMPREGNATION DEVICE AND MELT IMPREGNATION METHOD

(71) Applicant: KINGFA SCI. & TECH. CO., LTD., Guangdong (CN)

(72) Inventors: Xianbo Huang, Guangdong (CN); Chunhua Chen, Guangdong (CN); Yonghua Li, Guangdong (CN); Chao Zhang, Guangdong (CN); Zhongfu Luo, Guangdong (CN)

(73) Assignee: KINGFA SCI. & TECH. CO., LTD., Guangdong (CN)

( * ) Notice: Subject to any disclaimer, the term of this patent is extended or adjusted under 35 U.S.C. 154(b) by 437 days.

(21) Appl. No.: 15/853,993

(22) Filed: Dec. 26, 2017

(65) Prior Publication Data

US 2019/0184606 A1    Jun. 20, 2019

(30) Foreign Application Priority Data

Dec. 18, 2017  (CN) .......................... 2017 1 1367964

(51) Int. Cl.
*B29C 70/50*     (2006.01)
*B29B 15/12*     (2006.01)
(Continued)

(52) U.S. Cl.
CPC .............. *B29B 15/122* (2013.01); *B29B 9/14* (2013.01); *B29C 70/50* (2013.01); *B29K 2101/12* (2013.01)

(58) Field of Classification Search
CPC .................... B29C 70/50; B29B 15/122
See application file for complete search history.

(56) References Cited

U.S. PATENT DOCUMENTS 4,439,387 A * 3/1984 Hawley .................. B29C 70/20
                                                    264/108
4,883,625 A * 11/1989 Glemet ................. B29C 48/154
                                                    264/136
(Continued)

FOREIGN PATENT DOCUMENTS

CN        101856872        10/2010
DE     102015220186 A1 *   4/2017   ........... B29B 15/122
(Continued)

OTHER PUBLICATIONS

JPO Notice of Reasons for Refusal in application JP 2017248601, dated Oct. 30, 2018 (Year: 2018).*

(Continued)

*Primary Examiner* — Timothy Kennedy
(74) *Attorney, Agent, or Firm* — JCIPRNET

(57) ABSTRACT

The present invention discloses a melt impregnation device and a melt impregnation method. Through an impregnation chamber with a corrugated shape, when a resin melt-distributing runner is connected with a peak position of the impregnation chamber, a chamber vertical height of the peak position of the impregnation chamber is larger than a chamber vertical height of a trough position of the impregnation chamber, and when the resin melt-distributing runner is connected with the trough position of the impregnation chamber, the chamber vertical height of the trough position of the impregnation chamber is larger than the chamber vertical height of the peak position of the impregnation chamber. The present invention can balance an impregnating effect of a continuous fiber band, can carry a broken fiber hairiness which is generated during the impregnation out of an impregnation area, avoids a broken yarn, and enhances a production stability and a production efficiency.

10 Claims, 2 Drawing Sheets

(51) Int. Cl.
  *B29B 9/14*   (2006.01)
  *B29K 101/12*  (2006.01)

(56) References Cited

U.S. PATENT DOCUMENTS

| | | | | |
|---|---|---|---|---|
| 4,937,028 A * | 6/1990 | Glemet | .................. | B29C 48/09 |
| | | | | 264/136 |
| 5,043,128 A * | 8/1991 | Umeda | .................. | B29C 70/50 |
| | | | | 264/258 |
| 5,084,305 A * | 1/1992 | Marttila | ................ | B29B 15/122 |
| | | | | 118/405 |
| 5,277,566 A * | 1/1994 | Augustin | .............. | B29B 15/122 |
| | | | | 264/136 |
| 5,658,513 A * | 8/1997 | Amaike | .................... | B29B 9/14 |
| | | | | 264/171.13 |
| 6,270,851 B1 * | 8/2001 | Lee | ........................ | B29C 70/50 |
| | | | | 427/434.7 |
| 9,096,000 B2 * | 8/2015 | Maliszewski | ........... | B29B 11/16 |
| 9,238,336 B2 * | 1/2016 | Ishibashi | ................ | B29C 70/50 |
| 9,238,347 B2 * | 1/2016 | Nelson | .................. | B32B 27/288 |
| 9,321,073 B2 * | 4/2016 | Regan | .................... | B05C 3/172 |
| 10,022,919 B2 * | 7/2018 | Johnson | ................ | B05C 3/125 |
| 2013/0136890 A1 * | 5/2013 | Maliszewski | ....... | B29C 48/0018 |
| | | | | 428/113 |
| 2013/0136891 A1 * | 5/2013 | Nelson | .................... | B32B 27/08 |
| | | | | 428/114 |
| 2013/0145986 A1 * | 6/2013 | Regan | .................... | B05C 3/125 |
| | | | | 118/420 |
| 2014/0093649 A1 * | 4/2014 | Johnson | ................ | B29C 48/156 |
| | | | | 427/428.01 |
| 2016/0318216 A1 * | 11/2016 | Johnson | .................. | B29C 41/30 |
| 2019/0184653 A1 * | 6/2019 | Huang | .................. | B29B 15/122 |

FOREIGN PATENT DOCUMENTS

| | | | | |
|---|---|---|---|---|
| JP | 06293023 A | * | 10/1994 | ............... B29B 9/14 |
| JP | 07276515 A | * | 10/1995 | ............ B29B 15/122 |
| JP | 2017039322 A | * | 2/2017 | ............ B29B 15/122 |
| WO | WO-2006006614 A1 | * | 1/2006 | ........... B29C 70/504 |
| WO | WO-2012002410 A1 | * | 1/2012 | .............. C08J 5/042 |

OTHER PUBLICATIONS

JPO Written Opinion in application JP 2017248601, dated Nov. 20, 2018 (Year: 2018).*
JPO Decision to Grant a Patent in application JP 2017248601, dated Dec. 11, 2018 (Year: 2018).*
EPO European Search Report and Information on Search Strategy in application EP 17210442, dated Jul. 20, 2018 (Year: 2018).*
KIPO Notification of Reason for Refusal in application KR 20170179626, dated Feb. 14, 2019 (Year: 2019).*
KIPO Written Opinion in application KR 20170179626, dated Mar. 27, 2019 (Year: 2019).*
KIPO Grant of Patent in application KR 20170179626, dated Aug. 27, 2019 (Year: 2019).*

* cited by examiner

MELT IMPREGNATION DEVICE AND MELT IMPREGNATION METHOD

CROSS-REFERENCE TO RELATED APPLICATION

This application claims the priority benefit of China application serial no. 201711367964.X, filed on Dec. 18, 2017. The entirety of the above-mentioned patent application is hereby incorporated by reference herein and made a part of this specification.

TECHNICAL FIELD

The present invention relates to a melt impregnation device and a melt impregnation method, and specifically relates to a melt impregnation device and a melt impregnation method for a continuous fiber-reinforced thermoplastic resin composite material.

BACKGROUND

Currently, in a melt impregnation device for a continuous fiber-reinforced thermoplastic resin composite material, a continuous fiber bundle could not be melt impregnated uniformly, sufficiently and effectively due to an irrational structure of the melt impregnation device often, and thus a product quality is affected. Besides, as an extensive application of a continuous fiber material, it is extremely urgent to improve a capacity of a production line of which a major direction is to increase a number of a strip material, increase a drawing speed and enhance a production stability. Particularly, to increase the number of the strip material, a problem of distributing a melt uniformly exists; to increase the drawing speed, a balance problem of an impregnating effect exists; and to enhance the production stability, a problem of a fiber broken yarn is mainly taken into account.

In order to solve the above-mentioned problems, CN101856872A discloses a preparation method of a continuous fiber-reinforced thermoplastic composite material prepreg tape and a device thereof, wherein a preheated continuous fiber band is introduced into a stagger double-extrusion die set that can open and close. The stagger double-extrusion die set that can open and close includes a first extrusion die 101, a second extrusion die 102 and a track motion apparatus. The continuous fiber band is in contact with the first extrusion die 101 and generates an infiltration pressure that is perpendicular to a fiber band plane, making a molten thermoplastic resin pre-impregnate a side of the continuous fiber band. The other side of the continuous fiber band is in contact with the second extrusion die 102 and generates the same infiltration pressure, making the molten thermoplastic resin re-impregnate the other side of the continuous fiber band, shown as FIG. 1. Through the device with the above-described structure, both sides of multiple fiber bands are melt impregnated respectively. Although the number of the strip material may be increased, it is unlikely to guarantee a uniform impregnation of the multiple fiber bands when they are impregnated concurrently. Therefore, after the drawing speed is increased, it's more difficult to guarantee a balance of the impregnating effect. In addition, since a molten resin basis is coated on the fiber band by the first extrusion die 101 and the second extrusion die 102 in contact with both sides of the fiber band respectively, a friction is created between the first extrusion die 101 and the fiber band as well as between the second extrusion die 102 and the fiber band. Thus, a fiber would be left on the first extrusion die 101 and the second extrusion die 102 during the movement of the fiber band, resulting in an easily broken yarn of the fiber band during being coated with the resin basis, affecting the product quality and decreasing a production efficiency.

SUMMARY OF THE INVENTION

The present invention is to provide a melt impregnation device and a melt impregnation method, which can balance an impregnating effect of a continuous fiber band, can carry a broken fiber hairiness which is generated during the impregnation out of an impregnation area, and avoid a broken yarn, and to enhance a production stability and a production efficiency.

A melt impregnation device according to the present invention, includes a fiber pre-dispersion area for heating and dispersing a continuous fiber band, and a melt impregnation area for impregnating the continuous fiber band; the melt impregnation area includes a resin melt-distributing runner and an impregnation runner; the impregnation runner includes an upper die and a lower die, both a lower surface of the upper die and an upper surface of the lower die have a corrugated shape, and both have at least one peak and at least one trough, the peak and the trough on the lower surface of the upper die correspond to the trough and the peak on the upper surface of the lower die respectively, an impregnation chamber with a corrugated shape for impregnating the continuous fiber band is formed between the lower surface of the upper die and the upper surface of the lower die, the resin melt-distributing runner is connected with a peak of the impregnation chamber or a trough of the impregnation chamber by a piping, when the resin melt-distributing runner is connected with a peak position of the impregnation chamber, a chamber vertical height of the peak position of the impregnation chamber is larger than a chamber vertical height of a trough position of the impregnation chamber, and when the resin melt-distributing runner is connected with the trough position of the impregnation chamber, the chamber vertical height of the trough position of the impregnation chamber is larger than the chamber vertical height of the peak position of the impregnation chamber.

When the resin melt-distributing runner is connected with the peak position of the impregnation chamber, the chamber vertical height of the peak position of the impregnation chamber is 4 mm-20 mm, and the chamber vertical height of the trough position is 2 mm-10 mm; and when the resin melt-distributing runner is connected with the trough position of the impregnation chamber, the chamber vertical height of the trough position of the impregnation chamber is 4 mm-20 mm, and the chamber vertical height of the peak position is 2 mm-10 mm.

A melt impregnation method using the melt impregnation device to impregnate a continuous fiber band according to the present invention, has steps as follows:

1) introducing a single or multiple continuous fiber bands to a fiber pre-dispersion area, making the continuous fiber band successively wind each tension roller in the fiber pre-dispersion area, and preheating and dispersing the continuous fiber band;

2) injecting a resin melt into a resin melt-distributing runner of a melt impregnation area, and then the resin melt flowing into an impregnation chamber of an impregnation runner from the resin melt-distributing runner;

3) drawing the continuous fiber band which is preheated and dispersed, to the impregnation chamber of the impregnation runner for impregnation; and 4) cooling, drawing and pelletizing the continuous fiber band after completing the impregnation.

In the melt impregnation device and the melt impregnation method according to the present invention, the impregnation chamber with the corrugated shape for impregnating the continuous fiber band is formed between the lower surface of the upper die and the upper surface of the lower die, when the resin melt-distributing runner is connected with any peak position of the impregnation chamber, the chamber vertical height of the peak position of the impregnation chamber is larger than the chamber vertical height of the trough position of the impregnation chamber, and when the resin melt-distributing runner is connected with any trough position of the impregnation chamber, the chamber vertical height of the trough position of the impregnation chamber is larger than the chamber vertical height of the peak position of the impregnation chamber. Therefore, the resin melt can flow from a wide point of the corrugated impregnation chamber to a narrow point of the impregnation chamber, enormously increasing a flow velocity and a pressure of the resin melt, thus enormously enhancing an infiltration capacity of the resin melt infiltrating into the continuous fiber band, and guaranteeing a sufficiently balanced impregnating effect of the continuous fiber band. Meanwhile, owing to that both the lower surface of the upper die and the upper surface of the lower die have at least one peak and at least one trough, by using the corrugated impregnation chamber, the flow velocity and the pressure of the resin melt can be further enhanced, and an infiltrating impregnation capacity thereof can be enhanced. Since the impregnation capacity is enhanced, a drawing speed of the continuous fiber band can be increased, thus enhancing the production efficiency. Since the flow velocity and the pressure of the resin melt are enhanced, the continuous fiber hairiness in the impregnation chamber can also be carried out continuously, reducing accumulation of the continuous fiber hairiness, avoiding abrasion on the normal continuous fiber band, avoiding the broken yarn, and realizing a stable production. Besides, with help of the fiber pre-dispersion area to preheat and disperse the continuous fiber band, the subsequent resin melt would not be cooling-crystallized on a surface of the continuous fiber band, which facilitates the subsequent resin melt impregnating into the continuous fiber band more strongly, further guarantees sufficient and balanced impregnation of the continuous fiber band, improves the drawing speed of the continuous fiber band to a greater extent, and enhances the production efficiency.

When the resin melt-distributing runner is connected with the peak position of the impregnation chamber, the chamber vertical height of the peak position of the impregnation chamber is 4 mm-20 mm, and the chamber vertical height of the trough position is 2 mm-10 mm; and when the resin melt-distributing runner is connected with the trough position of the impregnation chamber, the chamber vertical height of the trough position of the impregnation chamber is 4 mm-20 mm, and the chamber vertical height of the peak position is 2 mm-10 mm. Therefore, in such range of the chamber vertical height, the flow velocity and the pressure of the resin melt can be enhanced to a greater extent, and thus the infiltration capacity of the resin melt is further improved.

DETAILED DESCRIPTION OF THE PREFERRED EMBODIMENT

Figure 1:
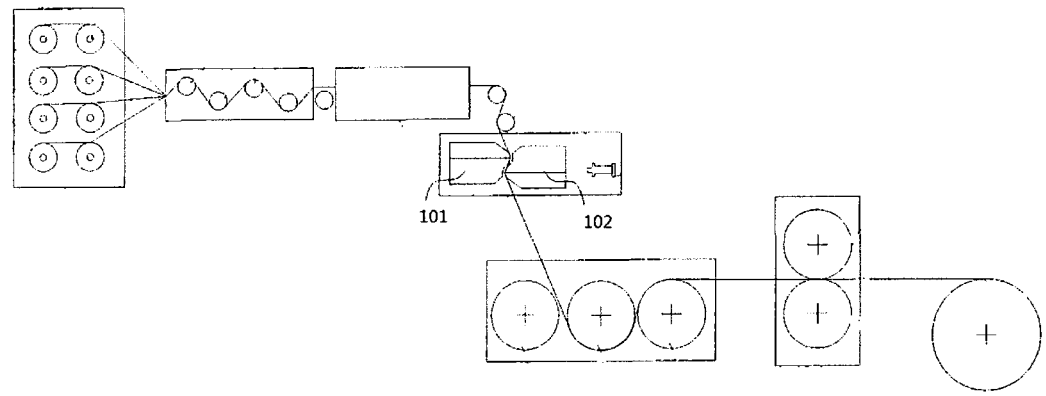
FIG. 1 is a structure diagram of the related art.
Figure 2:
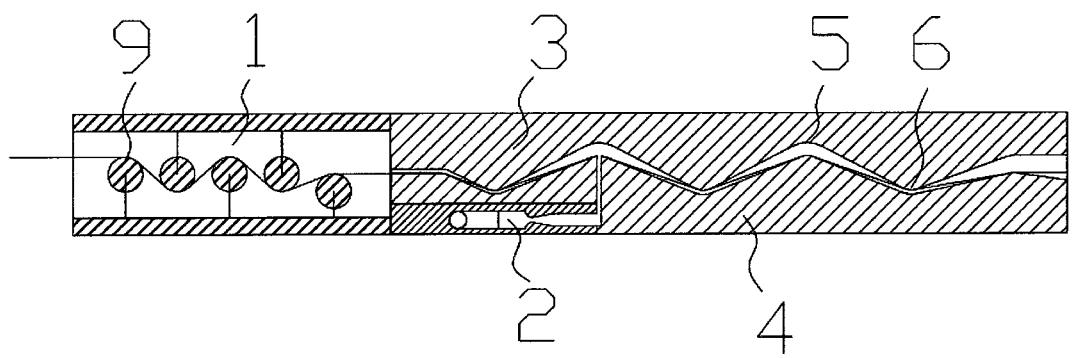
FIG. 2 is a structure diagram of the present invention.

A melt impregnation device, shown as FIG. 2, includes a fiber pre-dispersion area 1 for heating and dispersing a continuous fiber band, and a melt impregnation area for impregnating the continuous fiber band. The melt impregnation area includes a resin melt-distributing runner 2 and an impregnation runner. The impregnation runner includes an upper die 3 and a lower die 4, both a lower surface of the upper die 3 and an upper surface of the lower die 4 have a corrugated shape, and both have at least one peak 5 and at least one trough 6, for example both have one peak 5 and one trough 6, both have two peaks 5 and two troughs 6, both have three peaks 5 and three troughs 6, or both have four peaks 5 and four troughs 6, etc., in any combination according to actual needs. The peak 5 and the trough 6 on the lower surface of the upper die 3 correspond to the trough 6 and the peak 5 on the upper surface of the lower die 4 respectively. An impregnation chamber with a corrugated shape for impregnating the continuous fiber band is formed between the lower surface of the upper die 3 and the upper surface of the lower die 4. The resin melt-distributing runner 2 is connected with a peak of the impregnation chamber or a trough of the impregnation chamber by a piping. When the resin melt-distributing runner 2 is connected with a peak position of the impregnation chamber, a chamber vertical height of the peak position of the impregnation chamber is larger than a chamber vertical height of a trough position of the impregnation chamber. When the resin melt-distributing runner 2 is connected with the trough position of the impregnation chamber, the chamber vertical height of the trough position of the impregnation chamber is larger than the chamber vertical height of the peak position of the impregnation chamber.

The lower surface of the upper die 3 and the upper surface of the lower die 4 both have two peaks 5 and two troughs 6, which not only guarantee an impregnating effect of the continuous fiber band and enhance a production efficiency, but also avoid a complicated structure of the impregnation runner and simplify the structure of the impregnation runner. Besides, via an alternate change of the chamber vertical heights of the peak position and the trough position, uniform distributions of a flow velocity and a pressure of the resin melt can be effectively guaranteed.

When the resin melt-distributing runner 2 is connected with the peak position of the impregnation chamber, the chamber vertical height of the peak position of the impregnation chamber is 4 mm-20 mm, for example 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm or 20 mm, etc., and the chamber vertical height of the trough position is 2 mm-10 mm, for example 2 mm, 3 mm, 4 mm, 5 mm, 6 mm, 7 mm, 8 mm, 9 mm or 10 mm, etc. When the resin melt-distributing runner 2 is connected with the trough position of the impregnation chamber, the chamber vertical height of the trough position of the impregnation chamber is 4 mm-20 mm, for example 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm or 20 mm, and the chamber vertical height of the peak position is 2 mm-10 mm, for example 2 mm, 3 mm, 4 mm, 5 mm, 6 mm, 7 mm, 8 mm, 9 mm or 10 mm, etc.

When the resin melt-distributing runner 2 is connected with the peak position of the impregnation chamber, a height difference between the chamber vertical height of the peak position and the chamber vertical height of the trough position of the impregnation chamber is 5 mm-15 mm, for example 5 mm, 6 mm, 7 mm, 8 mm, 9 mm, 10 mm, 11 mm, 12 mm, 13 mm, 14 mm or 15 mm, etc., preferably 8 mm-12 mm. When the resin melt-distributing runner 2 is connected with the trough position of the impregnation chamber, a height difference between the chamber vertical height of the trough position and the chamber vertical height of the peak position of the impregnation chamber is 5 mm-15 mm, for example 5 mm, 6 mm, 7 mm, 8 mm, 9 mm, 10 mm, 11 mm, 12 mm, 13 mm, 14 mm or 15 mm, etc., preferably 8 mm-12 mm.

A radius of corrugation of the lower surface of the upper die 3 and a radius of corrugation of the upper surface of the lower die 4 are 5 mm-50 mm, for example 5 mm, 10 mm, 15 mm, 20 mm, 25 mm, 30 mm, 35 mm, 40 mm, 45 mm or 50 mm, etc. Besides, the radius of corrugation at the peak of the impregnation chamber can be randomly matched with the radius of corrugation at the trough, for example the radius of corrugation at the peak is consistent or inconsistent with the radius of corrugation at the trough, which is chosen according to actual need.

Figure 3:
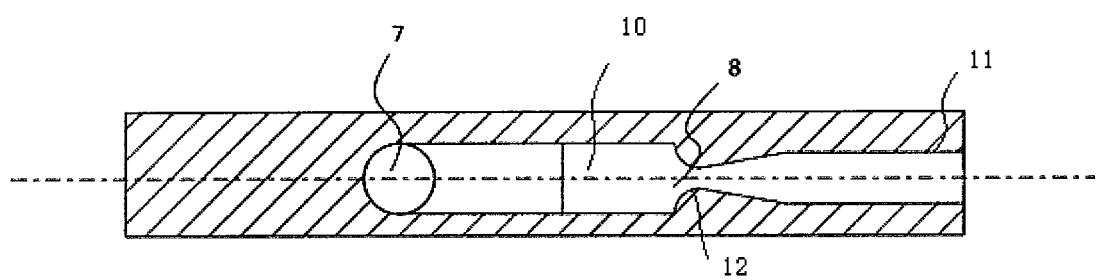
FIG. 3 is a front view of a resin melt-distributing runner in the present invention.
Figure 4:
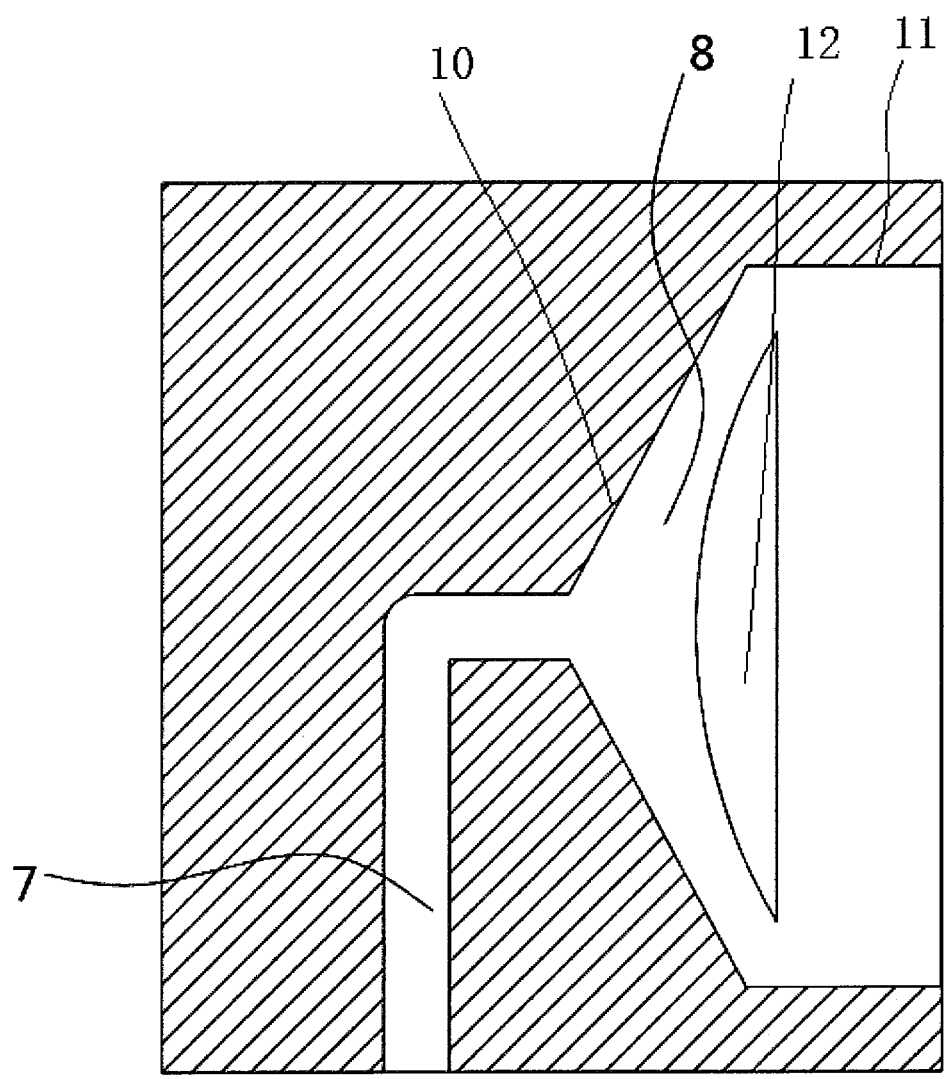
FIG. 4 is a top view of the resin melt-distributing runner in the present invention.

As shown in FIG. 3 and FIG. 4, the resin melt-distributing runner 2 includes a resin melt-injecting branch 7, and a resin melt-injecting head 8 connected with the resin melt-injecting branch 7. The resin melt-injecting head 8 includes a flared cavity 10 with a tabular shape that is connected with the resin melt-injecting branch 7 and a square cavity 11 connected with a tail of the flared cavity 10. Internally concave arc surfaces 12 are respectively provided on two planes between two opposite bevels of the flared cavity 10, and two internally concave arc surfaces 12 are symmetrically configured. Through the internally concave arc surfaces 12 are respectively provided on two planes between two opposite bevels of the flared cavity 10, and two internally concave arc surfaces 12 are symmetrically configured, thus a chamber height of the flared cavity 10 can be changed, thereby making the resin melt flow from a wide chamber of the flared cavity 10 to a narrow chamber, so as to vary the pressure and the flow velocity of a molten resin, and thus a uniformity of the resin melt flowing into the impregnation runner is enhanced.

A length of the resin melt-injecting branch 7 is 5 mm-100 mm, for example 5 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm or 100 mm, etc. A flare angle of the resin melt-injecting head 8 with a flared shape is 120°-175°, for example 120°, 125°, 130°, 135°, 140°, 145°, 150°, 155°, 160°, 165°, 170° or 175°, etc.

The fiber pre-dispersion area 1 includes at least two tension roller sets arranged front and rear, each tension roller set consists of two tension rollers 9 arranged front and rear, and an electromagnetic heating apparatus is provided on each tension roller 9. The continuous fiber band successively winds the tension roller 9, and the continuous fiber band is dispersed and preheated by a tension effect of the tension roller 9 and a heating effect of the electromagnetic heating apparatus, guaranteeing a more balanced and more sufficient impregnating effect subsequent.

A diameter of the tension roller 9 is 5 mm-150 mm, for example 5 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 115 mm, 120 mm, 125 mm, 130 mm, 135 mm, 140 mm, 145 mm or 150 mm, etc. A distance between shafts of the adjacent tension rollers 9 is 10 mm-500 mm, for example 10 mm, 30 mm, 50 mm, 70 mm, 90 mm, 110 mm, 130 mm, 150 mm, 180 mm, 200 mm, 220 mm, 250 mm, 280 mm, 310 mm, 350 mm, 390 mm, 430 mm, 450 mm, 480 mm or 500 mm, etc.

A melt impregnation method using the melt impregnation device to impregnate a continuous fiber band, has steps as follows: (1) introducing a single or multiple continuous fiber bands to a fiber pre-dispersion area 1, making the continuous fiber band successively wind each tension roller 9 in the fiber pre-dispersion area 1, and preheating and dispersing the continuous fiber band; (2) injecting a resin melt into a resin melt-distributing runner 2 of a melt impregnation area, and then the resin melt flowing into an impregnation chamber of an impregnation runner from the resin melt-distributing runner 2; (3) drawing the continuous fiber band which is preheated and dispersed, to the impregnation chamber of the impregnation runner for impregnation; and (4) cooling, drawing and pelletizing the continuous fiber band after completing the impregnation. In step (1), a temperature for preheating the continuous fiber band is 60° C.-400° C., for example 60° C., 70° C., 80° C., 90° C., 100° C., 110° C., 120° C., 130° C., 140° C., 150° C., 160° C., 170° C., 180° C., 190° C., 200° C., 210° C., 220° C., 230° C., 240° C., 250° C., 260° C., 270° C., 280° C., 290° C., 300° C., 310° C., 320° C., 330° C., 340° C., 350° C., 360° C., 370° C., 380° C., 390° C. or 400° C., etc., preferably 200° C.

Directional indications (such as upper surface, lower surface, etc.) related in the present invention are only used to explain a relative position relationship among each component when the melt impregnation device is in a condition as FIG. 2. If a specific condition changes, the directional indication changes correspondingly.

The present invention will be further described by specific implementations. Following embodiments are preferred implementations of the present invention, but the implementation of the present invention is not limited by following embodiments.

Embodiment 1

Single or multiple continuous fiber bands were introduced to a fiber pre-dispersion area 1. There were two tension roller sets in the fiber pre-dispersion area 1, and the continuous fiber band wound each tension roller 9 in the fiber pre-dispersion area 1 successively. The continuous fiber band was preheated and dispersed, and a temperature for preheating was 60° C. A diameter of the tension roller 9 was 50 mm, and a distance between the adjacent tension rollers 9 was 200 mm. A resin melt was injected into a resin melt-distributing runner 2 of a melt impregnation area, and then flowed into an impregnation chamber of an impregnation runner from the resin melt-distributing runner 2. The continuous fiber band, which was preheated and dispersed, was drawn to the impregnation chamber of the impregnation runner for impregnation. Both a lower surface of an upper die 3 of the impregnation runner and an upper surface of a lower die 4 had one peak 5 and one trough 6, with a radius of corrugation of 10 mm. The resin melt-distributing runner 2 was connected with a peak position of the impregnation chamber. A chamber vertical height of the peak position of the impregnation chamber was 4 mm, and a chamber vertical height of a trough position of the impregnation chamber is 2 mm. A length of a resin melt-injecting branch 7 of the resin melt-distributing runner 2 was 100 mm, and a flare angle of a resin melt-injecting head 8 with a flared shape was 120°. Cooling, drawing and pelletizing were carried out on the continuous fiber band after completing the impregnation.

A drawing speed under a circumstance without a broken yarn was tested as 45 m/min via a tachometer.

Embodiment 2

Based on Embodiment 1, the temperature for preheating the continuous fiber band was set as 400° C. The resin melt-distributing runner 2 was connected with the trough position of the impregnation chamber. The chamber vertical height of the trough position of the impregnation chamber was 4 mm, and the chamber vertical height of the peak position of the impregnation chamber was 2 mm. Other details were the same as Embodiment 1. The drawing speed under the circumstance without the broken yarn was tested as 47 m/min via the tachometer.

Embodiment 3

Based on Embodiment 1, the temperature for preheating the continuous fiber band was set as 200° C. The chamber vertical height of the peak position of the impregnation chamber was 10 mm, and the chamber vertical height of the trough position of the impregnation chamber was 5 mm. A height difference between the chamber vertical height of the peak position and the chamber vertical height of the trough position of the impregnation chamber was 5 mm. Other details were the same as Embodiment 1. The drawing speed under the circumstance without the broken yarn was tested as 52 m/min via the tachometer.

Embodiment 4

Based on Embodiment 1, the temperature for preheating the continuous fiber band was set as 200° C. The chamber vertical height of the peak position of the impregnation chamber was 20 mm, and the chamber vertical height of the trough position of the impregnation chamber was 5 mm. The height difference between the chamber vertical height of the peak position and the chamber vertical height of the trough position of the impregnation chamber was 15 mm. Other details were the same as Embodiment 1. The drawing speed under the circumstance without the broken yarn was tested as 56 m/min via the tachometer.

Embodiment 5

Based on Embodiment 1, the temperature for preheating the continuous fiber band was set as 200° C. Both the lower surface of the upper die 3 of the impregnation runner and the upper surface of the lower die 4 had two peaks 5 and two troughs 6. The chamber vertical height of the peak position of the impregnation chamber was 18 mm, and the chamber vertical height of the trough position of the impregnation chamber was 10 mm. The height difference between the chamber vertical height of the peak position and the chamber vertical height of the trough position of the impregnation chamber was 8 mm. Other details were the same as Embodiment 1. The drawing speed under the circumstance without the broken yarn was tested as 58 m/min via the tachometer.

Embodiment 6

Based on Embodiment 1, the temperature for preheating the continuous fiber band was set as 200° C. Both the lower surface of the upper die 3 of the impregnation runner and the upper surface of the lower die 4 had two peaks 5 and two troughs 6. The chamber vertical height of the peak position of the impregnation chamber was 15 mm, and the chamber vertical height of the trough position of the impregnation chamber was 3 mm. The height difference between the chamber vertical height of the peak position and the chamber vertical height of the trough position of the impregnation chamber was 12 mm. Other details were the same as Embodiment 1. The drawing speed under the circumstance without the broken yarn was tested as 60 m/min via the tachometer.

Comparative Example 1

A continuous fiber was introduced from a continuous fiber roll on a creel and unfolded. After successively passing by a tension adjusting device, an electrostatic eliminating device, a preheating device and a tension adjusting device, a preheated continuous fiber band was obtained. The preheated continuous fiber band was directed into a stagger double-extrusion die set that can open and close for pre-impregnation. The pre-impregnated continuous fiber band was directed into an impregnating calendar roll set for impregnation, followed by being cooled and sized through a cooling roll-in device, and finally was directed into a drawing windup device for winding and formation. A continuous fiber-reinforced thermoplastic composite material prepreg tape was obtained. The preheated continuous fiber band was directed into the stagger double-extrusion die set that can open and close. The stagger double-extrusion die set that can open and close included an extrusion die a, an extrusion die b and a track motion device. The continuous fiber band was in contact with the extrusion die a and generated an infiltration pressure that was perpendicular to a fiber band plane, making a molten thermoplastic resin pre-impregnate a side of the continuous fiber band. The other side of the continuous fiber band was in contact with the extrusion die b and generated the same infiltration pressure, making the molten thermoplastic resin re-impregnate the other side of the continuous fiber band.

The drawing speed under the circumstance without the broken yarn was tested as 20 m/min via the tachometer.

It can be seen from the comparison among Embodiments 1-5 and Comparative Example 1 that under the circumstance without the broken yarn, the drawing speed of the melt impregnation device of the present invention was faster, leading to a high production stability and a high efficiency.

What is claimed:

1. A melt impregnation device, including a fiber pre-dispersion area for heating and dispersing a continuous fiber band, and a melt impregnation area for impregnating the continuous fiber band, wherein the melt impregnation area comprises a resin melt-distributing runner and an impregnation runner; the impregnation runner comprises an upper die and a lower die, both a lower surface of the upper die and an upper surface of the lower die have a corrugated shape, and both have at least one peak and at least one trough, the peak and the trough on the lower surface of the upper die correspond to the trough and the peak on the upper surface of the lower die respectively, an impregnation chamber with a corrugated shape for impregnating the continuous fiber band is formed between the lower surface of the upper die and the upper surface of the lower die, the resin melt-distributing runner is connected with a peak of the impregnation chamber or a trough of the impregnation chamber by a piping, when the resin melt-distributing runner is connected with a peak position of the impregnation chamber, a chamber vertical height of the peak position of the impregnation chamber is larger than a chamber vertical height of a trough position of the impregnation chamber, and when the resin melt-distributing runner is connected with the trough position of the impregnation chamber, the chamber vertical height of the trough position of the impregnation chamber is larger than the chamber vertical height of the peak position of the impregnation chamber.

2. The melt impregnation device according to claim 1, wherein both the lower surface of the upper die and the upper surface of the lower die have two peaks and two troughs.

3. The melt impregnation device according to claim 1, wherein when the resin melt-distributing runner is connected with the peak position of the impregnation chamber, the chamber vertical height of the peak position of the impregnation chamber is 4 mm-20 mm, and the chamber vertical height of the trough position is 2 mm-10 mm; and when the resin melt-distributing runner is connected with the trough position of the impregnation chamber, the chamber vertical height of the trough position of the impregnation chamber is 4 mm-20 mm, and the chamber vertical height of the peak position is 2 mm-10 mm.

4. The melt impregnation device according to claim 3, wherein when the resin melt-distributing runner is connected with the peak position of the impregnation chamber, a height difference between the chamber vertical height of the peak position of the impregnation chamber and the chamber vertical height of the trough position of the impregnation chamber is 5 mm-15 mm; and when the resin melt-distributing runner is connected with the trough position of the impregnation chamber, a height difference between the chamber vertical height of the trough position of the impregnation chamber and the chamber vertical height of the peak position of the impregnation chamber is 5 mm-15 mm.

5. The melt impregnation device according to claim 4, wherein when the resin melt-distributing runner is connected with the peak position of the impregnation chamber, the height difference between the chamber vertical height of the peak position of the impregnation chamber and the chamber vertical height of the trough position of the impregnation chamber is 8 mm-12 mm; and when the resin melt-distributing runner is connected with the trough position of the impregnation chamber, the height difference between the chamber vertical height of the trough position of the impregnation chamber and the chamber vertical height of the peak position of the impregnation chamber is 8 mm-12 mm.

6. The melt impregnation device according to claim 1, wherein a radius of corrugation of the lower surface of the upper die and a radius of corrugation of the upper surface of the lower die are 5 mm-50 mm.

7. The melt impregnation device according to claim 1, wherein the resin melt-distributing runner comprises a resin melt-injecting branch, and a resin melt-injecting head connected with the resin melt-injecting branch, the resin melt-injecting head comprises a flared cavity with a tabular shape that is connected with the resin melt-injecting branch and a square cavity connected with a tail of the flared cavity, internally concave arc surfaces are respectively provided on two planes between two opposite bevels of the flared cavity, and two of the internally concave arc surfaces are symmetrically configured.

8. The melt impregnation device according to claim 7, wherein a length of the resin melt-injecting branch is 5 mm-100 mm; and a flare angle of the resin melt-injecting head with a flared shape is 120°-175°.

9. The melt impregnation device according to claim 1, wherein the fiber pre-dispersion area comprises at least two tension roller sets arranged front and rear, each of the tension roller set comprises two tension rollers arranged front and rear, and an electromagnetic heating apparatus is provided on each tension roller.

10. The melt impregnation device according to claim 9, wherein a diameter of the tension roller is 5 mm-150 mm, and a distance between the adjacent tension rollers is 10 mm-500 mm.

* * * * *